US010317722B2

United States Patent
Fukami (10) Patent No.: US 10,317,722 B2
(45) Date of Patent: Jun. 11, 2019

(54) DISPLAY DEVICE

(71) Applicant: Panasonic Liquid Crystal Display Co., Ltd., Himeji-shi, Hyogo (JP)

(72) Inventor: Tetsuo Fukami, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/471,787

(22) Filed: Mar. 28, 2017

(65) Prior Publication Data

US 2018/0004035 A1 Jan. 4, 2018

(30) Foreign Application Priority Data

Jun. 30, 2016 (JP) .................................. 2016-129934

(51) Int. Cl.
*G02F 1/1335* (2006.01)
*G02F 1/1339* (2006.01)

(52) U.S. Cl.
CPC .... *G02F 1/133512* (2013.01); *G02F 1/13394* (2013.01)

(58) Field of Classification Search
CPC ..................... G02F 1/133512; G02F 1/13394
USPC ......................................... 349/110, 155–157
See application file for complete search history.

(56) References Cited

U.S. PATENT DOCUMENTS

| 2003/0025686 | A1* | 2/2003 | Lee ....................... G06F 3/1454 345/204 |
| 2003/0025868 | A1* | 2/2003 | Hiroshima .......... G02F 1/13394 349/156 |
| 2012/0099061 | A1* | 4/2012 | Lee ......................... G02B 5/22 349/110 |

FOREIGN PATENT DOCUMENTS

JP 2012-163755 8/2012

* cited by examiner

*Primary Examiner* — Thanh Nhan P Nguyen
(74) *Attorney, Agent, or Firm* — Hamre, Schumann, Mueller & Larson, P.C.

(57) ABSTRACT

A pixel section which is a display region, and a frame section which is a non-display region surrounding a periphery of the pixel section are defined in a display device. The display device comprises a first display panel including: a first substrate; a second substrate disposed opposite to the first substrate and including a light shielding layer; and a plurality of spacers formed between these two substrate. The second substrate includes a first frame area constituting a portion disposed in the frame section. The first frame area includes a light shielding forming region and a light shielding non-forming region. A spacer disposed in the frame section among the plurality of spacers is formed on the light shielding forming region in the first frame area. The light shielding non-forming region is disposed around the spacer disposed on the light shielding forming region.

13 Claims, 6 Drawing Sheets

DISPLAY DEVICE

CROSS-REFERENCE TO RELATED APPLICATION

This application claims priority from Japanese application JP 2016-129934, filed Jun. 30, 2016. This Japanese application is incorporated herein by reference.

TECHNICAL FIELD

The present invention relates to a display device.

BACKGROUND

A color filter substrate (counter substrate) constituting the display device generally includes light shielding layers, a coloring material layer formed between the light shielding layers, an overcoat layer formed on the light shielding layer and the coloring material layer to flatten a surface, and a spacer formed on the overcoat layer.

SUMMARY

As disclosed in Unexamined Japanese Patent Publication No. 2012-163755, unlike a color image display panel, an opening region formed between adjacent light shielding layers is not filled with a coloring material layer in a pixel section that is a display region of a monochrome image display panel. For this reason, a level difference is formed due to a thickness of the light shielding layer in the pixel section of the monochrome image display panel. Because the light shielding layer is formed in a whole frame section that is a non-display region surrounding an outside of the display region, the pixel section differs largely from the frame section in a formation area of the light shielding layer. In the display device including the monochrome image display panel, when a resin material for forming a spacer is applied, a large amount of resin material is laminated in the frame section while a relatively small amount of resin material is laminated in the pixel section due to the level difference or the small formation area of the light shielding layer. Then, a resist is applied to perform etching, and the spacer is formed. At this point, the pixel section differs from the frame section in a height of the spacer, which results in a non-uniform gap between a first substrate and a second substrate.

The present disclosure has been made in view of the above problems, and an object thereof is to uniformize the gap between the substrates in the display device including the monochrome image display panel.

To solve the above problem, a display device according to a present disclosure comprises: a first display panel in which a pixel section is defined as a display region where an image is displayed and a frame section is defined as a non-display region surrounding a periphery of the pixel section, wherein the first display panel includes: a first substrate; a second substrate that is disposed opposite to the first substrate and includes a light shielding layer; and a plurality of spacers formed between the first substrate and the second substrate, the second substrate includes a first frame area constituting a part of said second substrate disposed in the frame section, the first frame area including a light shielding forming region where the light shielding layer is formed and a light shielding non-forming region where the light shielding layer is not formed, and a spacer disposed in the frame section among in the plurality of spacers is formed on the light shielding forming region in the first frame area of the second substrate, and the light shielding non-forming region is disposed around the spacer disposed on the light shielding forming region.

In the display device according to the present disclosure, the light shielding non-forming region may be formed between neighboring two light shielding forming regions in planar view.

In the display device according to the present disclosure, the light shielding forming region may include a first frame-shaped light shielding forming region surrounding the periphery of the pixel section and a second frame-shaped light shielding forming region located outside the first frame-shaped light shielding forming region to surround the first frame-shaped light shielding forming region, and the light shielding non-forming region may be disposed between the first frame-shaped light shielding forming region and the second frame-shaped light shielding forming region.

In the display device according to the present disclosure, a plurality of the light shielding forming regions may be arranged so as to be separated from each other. In other words, a plurality of the light shielding forming regions may be formed into an island shape in planar view. And the light shielding non-forming region may be formed around the light shielding forming region.

In the display device according to the present disclosure, the second substrate may further include a first pixel area constituting a part of said second substrate disposed in the pixel section, a width of the light shielding layer located in the first pixel area and a width of the light shielding layer located in the first frame area may be equal to each other.

In the display device according to the present disclosure, the second substrate may further include a first pixel area constituting a part of said second substrate disposed in the pixel section, and an interval between adjacent light shielding layers formed in the first pixel area of the second substrate and an interval between adjacent light shielding layers formed in the first frame area of the second substrate may be equal to each other.

In the display device according to the present disclosure, the light shielding non-forming region may be formed into an annular-shape so as to surround a periphery of the spacer disposed in the light shielding forming region in planar view.

In the first pixel area of the second substrate of the display device according to the present disclosure, a plurality of the light shielding layers may be arranged so as to be separated from each other. In other words, in the first pixel area of the second substrate, a plurality of the light shielding layers may be formed into an island shape in planar view.

In the display device according to the present disclosure, the first display panel may display a monochrome image.

The display device according to the present disclosure may further comprising a second display panel that displays a color image, the second display panel being disposed while overlapped on the first display panel.

In the display device according to the present disclosure, the second display panel may include a second frame area constituting a part of said second display panel disposed in the frame section, the second frame area including a second light shielding layer, and the light shielding non-forming region disposed in the first frame area of the first display panel may overlap the second light shielding layer in planar view.

DETAILED DESCRIPTION

First Exemplary Embodiment

One embodiment of the present application is described below with reference to the drawings.

Figure 1:
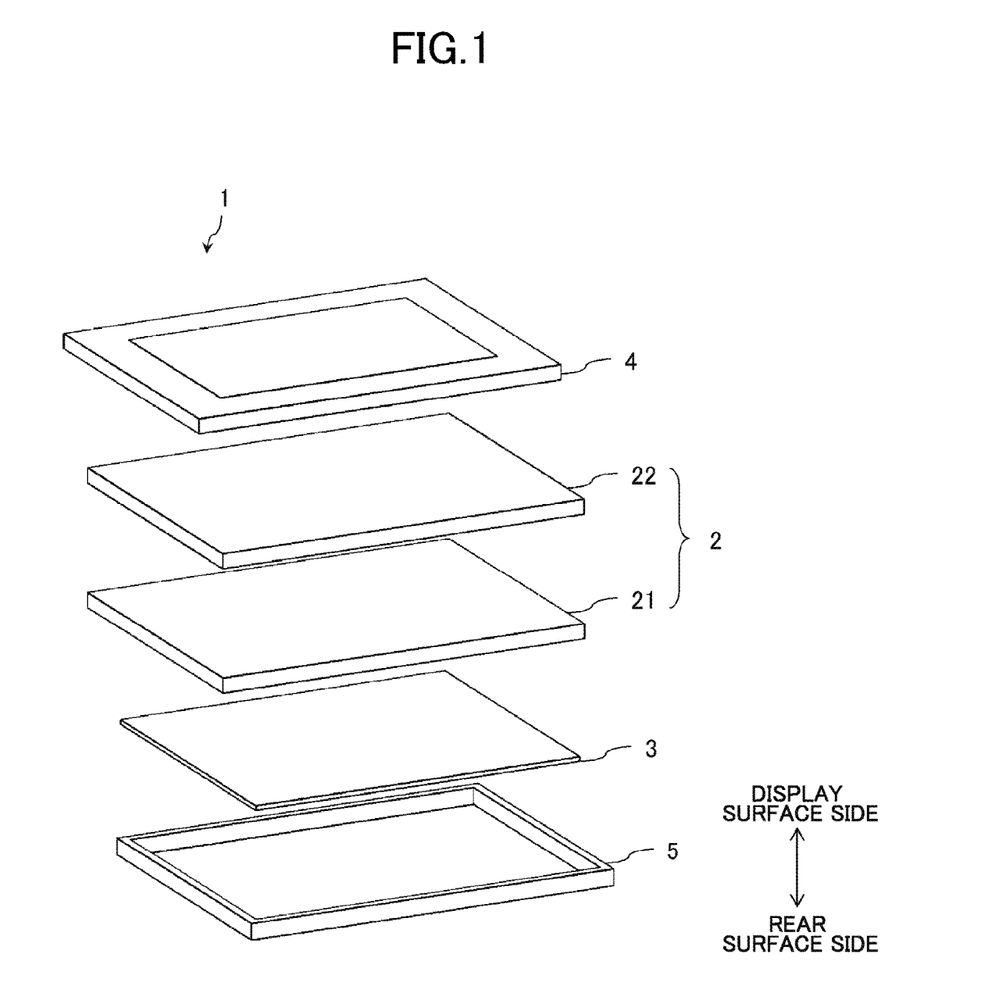
FIG. 1 is an exploded view illustrating a schematic configuration of a display device according to an exemplary embodiment.

FIG. 1 is an exploded perspective view schematically illustrating an entire configuration of liquid crystal display device 1 according to the first exemplary embodiment. Liquid crystal display device 1 includes display panel 2 that displays an image, backlight unit 3 that irradiates display panel 2 with light from a rear surface side of display panel 2, and frames (upper frame 4, lower frame 5) disposed on peripheries of display panel 2 and backlight unit 3.

Display panel 2 includes first display panel 21 and second display panel 22 disposed on a display surface side of first display panel 21, and display panel 2 is constructed by overlapping first display panel 21 and second display panel 22 each other. First display panel 21 is a display panel for displaying a monochrome image, and second display panel 22 is a display panel for displaying a color image.

Figure 2:
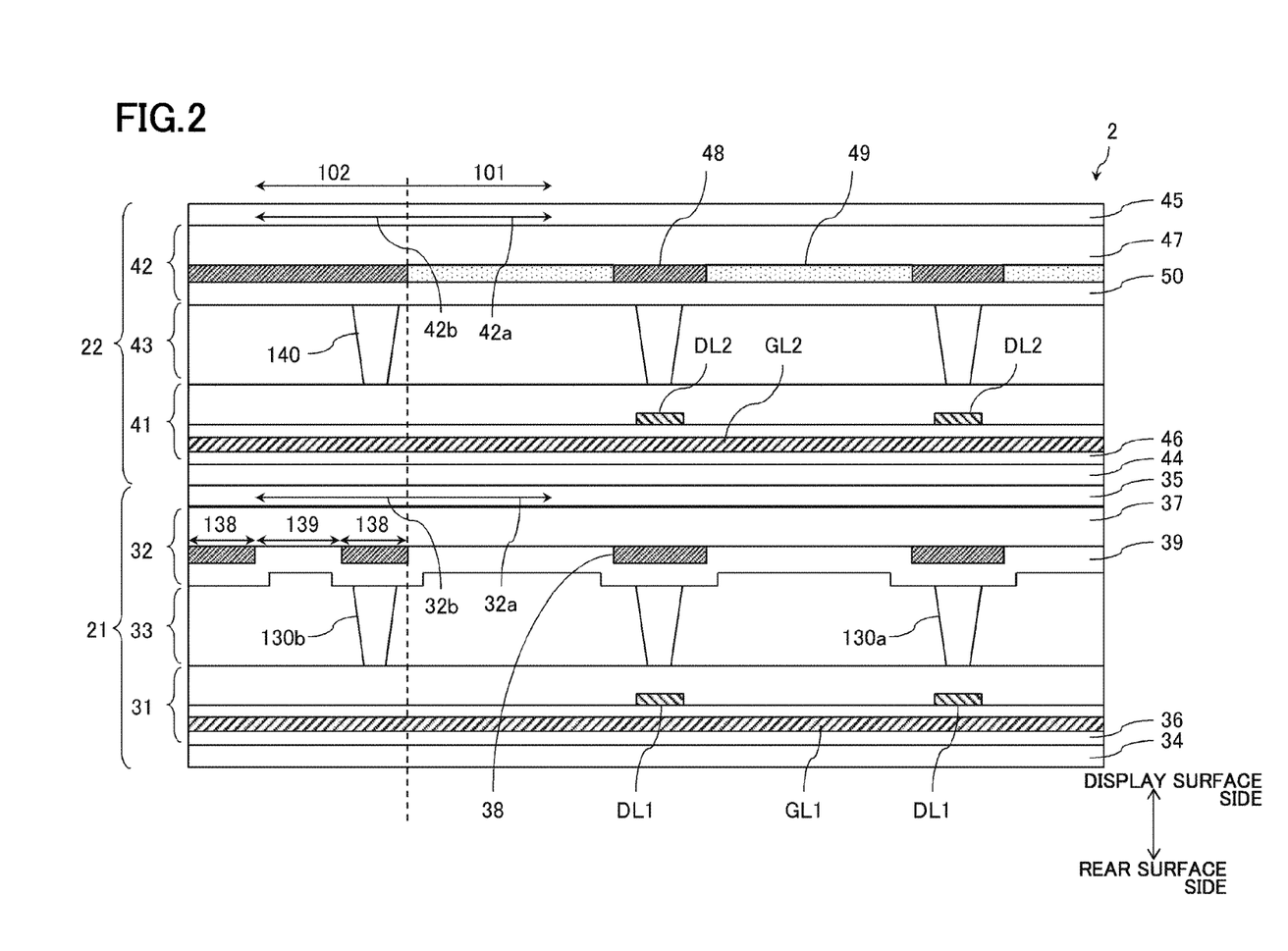
FIG. 2 is a partly cross-sectional view illustrating the display device shown in FIG. 1.

FIG. 2 is a partially sectional view illustrating display panel 2 of the first exemplary embodiment.

As illustrated in FIG. 2, first display panel 21 includes thin film transistor (TFT) substrate 31 (first substrate) disposed on the rear surface side thereof, counter substrate 32 (second substrate) disposed on the display surface side that is the side of second display panel 22, liquid crystal layer 33 sandwiched between TFT substrate 31 and counter substrate 32, lower polarizing plate 34 disposed on the rear surface side of TFT substrate 31, and upper polarizing plate 35 disposed on the display surface side of counter substrate 32.

In TFT substrate 31, a plurality of gate lines GL1 extending in a row direction and a plurality of data lines DL1 extending in a column direction are formed on glass substrate 36, and a thin film transistor is formed near each of intersections of the plurality of gate lines GL1 and the plurality of data lines DL1.

In counter substrate 32, light shielding layer 38 (first light shielding layer) that blocks light transmission is formed on glass substrate 37, and overcoat layer 39 is formed so as to cover light shielding layer 38. A plurality of spacers 130 (130a, 130b) are formed in counter substrate 32. The plurality of spacers 130 are disposed between TFT substrate 31 and counter substrate 32 to hold a gap between substrates 31 and 32. The plurality of spacers 130 are disposed so as to overlap light shielding layer 38 in planar view. In planar view of first display panel 21, a region surrounded by two gate lines GL1 adjacent to each other and two data lines DL1 adjacent to each other is defined as one pixel, and a plurality of pixels are arrayed into a matrix shape.

Second display panel 22 includes TFT substrate 41 disposed on the rear surface side that is the side of first display panel 21, counter substrate 42 disposed on the display surface side, liquid crystal layer 43 sandwiched between TFT substrate 41 and counter substrate 42, lower polarizing plate 44 disposed on the rear surface side of TFT substrate 41, and upper polarizing plate 45 disposed on the display surface side of counter substrate 42.

In TFT substrate 41, a plurality of gate lines GL2 extending in the row direction and a plurality of data lines DL2 extending in the column direction are formed on glass substrate 46, and a thin film transistor is formed near each of intersections of the plurality of gate lines GL2 and the plurality of data lines DL2.

In counter substrate 42, light shielding layer 48 (second light shielding layer) that blocks the light transmission and coloring material layer 49 (for example, a red layer, a green layer, and a blue layer) are formed on glass substrate 47, and overcoat layer 50 is formed so as to cover light shielding layer 48 and coloring material layer 49. A plurality of spacers 140 are formed in counter substrate 42. The plurality of spacers 140 are disposed between TFT substrate 41 and counter substrate 42 to hold a gap between substrates 41 and 42. The plurality of spacers 140 are disposed on light shielding layer 48 (in other words, so as to overlap light shielding layer 48 in planar view). In planar view of second display panel 22, a region surrounded by two gate lines GL2 adjacent to each other and two data lines DL2 adjacent to each other is defined as one pixel, and a plurality of pixels are arrayed into a matrix shape.

Display panel 2 includes pixel section 101 that is the display region where the image is displayed and frame section 102 that is the non-display region surrounding a periphery of pixel section 101. Counter substrate 32 of first display panel 21 includes first pixel area 32a that is a part of said counter substrate 32 disposed in pixel section 101 and first frame area 32b that is a part of said counter substrate 32 disposed in frame section 102. That is, counter substrate 32 of first display panel 21 is partitioned into first pixel area 32a and first frame area 32b, and first frame area 32b surrounds the periphery of first pixel area 32a. Counter substrate 42 of second display panel 22 includes second pixel area 42a constituting a part of said counter substrate 42 disposed in pixel section 101 and second frame area 42b constituting a part of said counter substrate 32 disposed in frame section 102. That is, counter substrate 42 of second display panel 22 is partitioned into second pixel area 42a and second frame area 42b, and second frame area 42b surrounds the periphery of second pixel area 42a. Light shielding layer 48 is formed in whole second frame area 42b of counter substrate 42 of second display panel 22 in planar view. On the other hand, first frame area 32b of counter substrate 32 of first display panel 21 includes light shielding forming region 138 where light shielding layer 38 is formed and light shielding non-forming region 139 where light shielding layer 38 is not formed. In first pixel area 32a and second pixel area 42a, each of light shielding layers 38, 48 is formed at a boundary between the adjacent pixels in planar view.

Figure 3:
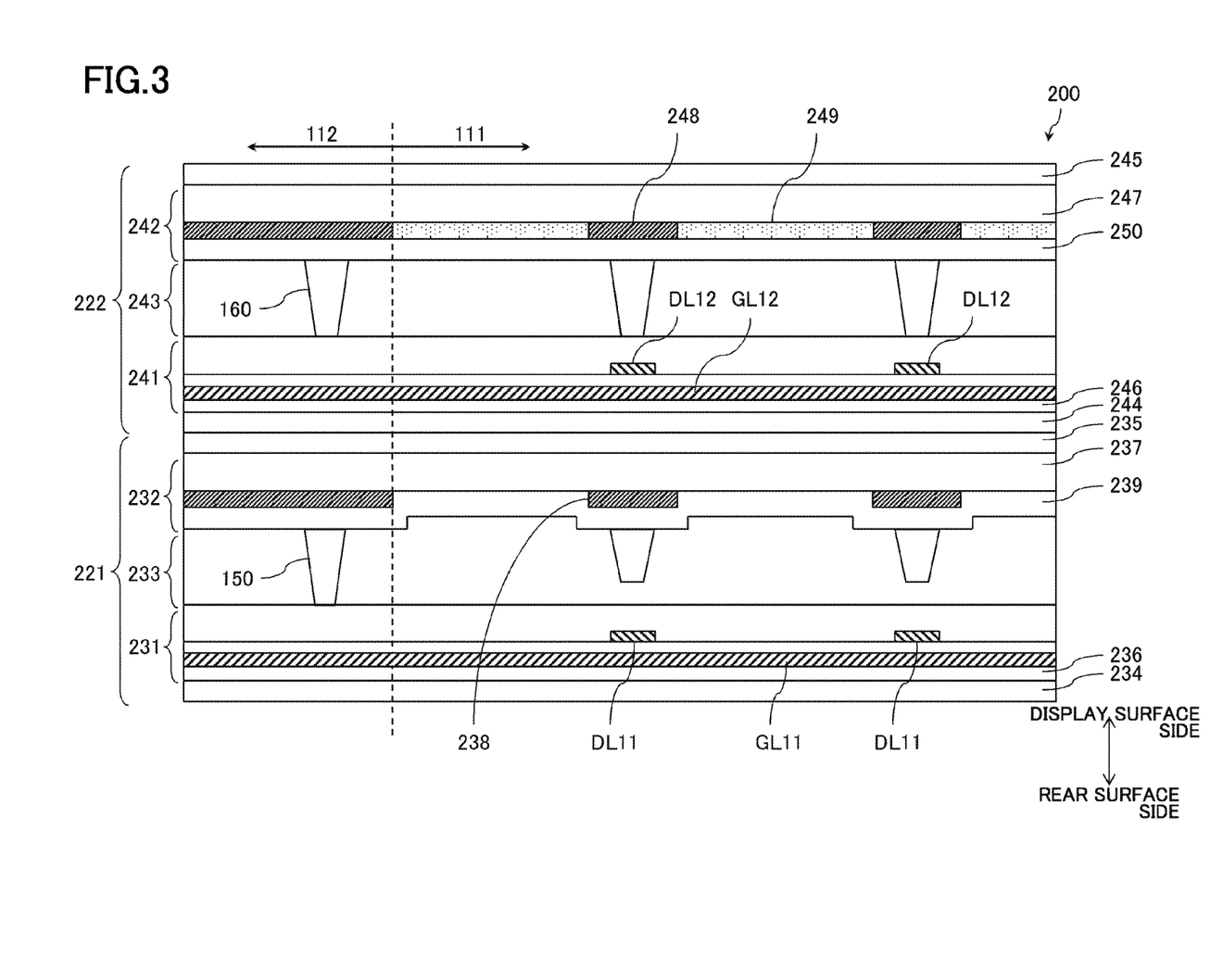
FIG. 3 is a partly cross-sectional view illustrating a display device according to a comparative example.

Liquid crystal display device 100 according to a comparative example will be described below with reference to FIG. 3. FIG. 3 is a partially sectional view illustrating display panel 200 included in liquid crystal display device 100 of the comparative example. A difference between display panel 2 in FIG. 2 and the comparative example will mainly be described below.

As illustrated in FIG. 3, display panel 200 of the comparative example includes first display panel 221 and second display panel 222 disposed on the display surface side of first display panel 221. First display panel 221 includes TFT substrate 231 disposed on the rear surface side thereof, counter substrate 232 disposed on the display surface side thereof, liquid crystal layer 233 sandwiched between TFT substrate 231 and counter substrate 232, lower polarizing plate 234 disposed on the rear surface side of TFT substrate 231, and upper polarizing plate 235 disposed on the display surface side of counter substrate 232. Second display panel 222 includes TFT substrate 241 disposed on the rear surface side thereof, counter substrate 242 disposed on the display surface side thereof, liquid crystal layer 243 sandwiched between TFT substrate 241 and counter substrate 242, lower polarizing plate 244 disposed on the rear surface side of TFT substrate 241, and upper polarizing plate 245 disposed on the display surface side of counter substrate 242.

According to liquid crystal display device 100 of the comparative example, in counter substrate 232 of first display panel 221, in pixel section 111, light shielding layer 238 is formed at the boundary between the adjacent pixels, but the coloring material layer is not formed between adjacent light shielding layers 238. On the other hand, in frame section 112, light shielding layer 238 is formed so as to overlap whole frame section 112 in planar view. For this reason, in pixel section 111, not only the level difference is formed by light shielding layer 238, but also a formation area of light shielding layer 238 is smaller than that of frame section 112. In frame section 112, not only the level difference is not formed by light shielding layer 238, but also the formation area of light shielding layer 238 is larger than that of pixel section 111. When overcoat layer 239 is formed on light shielding layer 238, a convex region (projection region) is formed in overcoat layer 239 according to light shielding layer 238. As illustrated in FIG. 3, in pixel section 111, a plurality of convex regions are formed in overcoat layer 239. In frame section 112, overcoat layer 239 is formed flat in whole frame section 112, and whole frame section 112 is formed so as to overlap with the convex region. Accordingly, the formation area of the convex region in overcoat layer 239 of frame section 112 is larger than that of pixel section 111. When the spacer forming resin material is applied to the convex region of overcoat layer 239 by spin coating, the spacer forming resin film is thinned in pixel section 111 because of the small formation area of each convex region of overcoat layer 239, and the spacer forming resin film is thickened in the frame section 112 because the convex region of overcoat layer 239 is widely formed flat. Therefore, spacer 150 formed in frame section 112 is higher than spacer 150 formed in pixel section 111. Resultantly, in liquid crystal display device 100 of the comparative example, a non-uniform gap is generated between TFT substrate 231 and second substrate 232.

On the other hand, in the first exemplary embodiment, as illustrated in FIG. 2, first frame area 32b of counter substrate 32 of first display panel 21 includes light shielding forming region 138 where light shielding layer 38 is formed and light shielding non-forming region 139 where light shielding layer 38 is not formed. Additionally, spacers 130b disposed in frame section 102 among the plurality of spacers 130 is formed so as to overlap light shielding forming region 138 in planar view, and light shielding non-forming region 139 is disposed in the periphery of light shielding forming region 138. Therefore, in the first exemplary embodiment, not only the level difference is formed by light shielding layer 38 in frame section 102, but also the formation area of light shielding layer 38 and the formation area of the convex region of overcoat layer 239 are reduced in frame section 102. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 of liquid crystal display device 1 and counter substrate 32.

Figure 4:
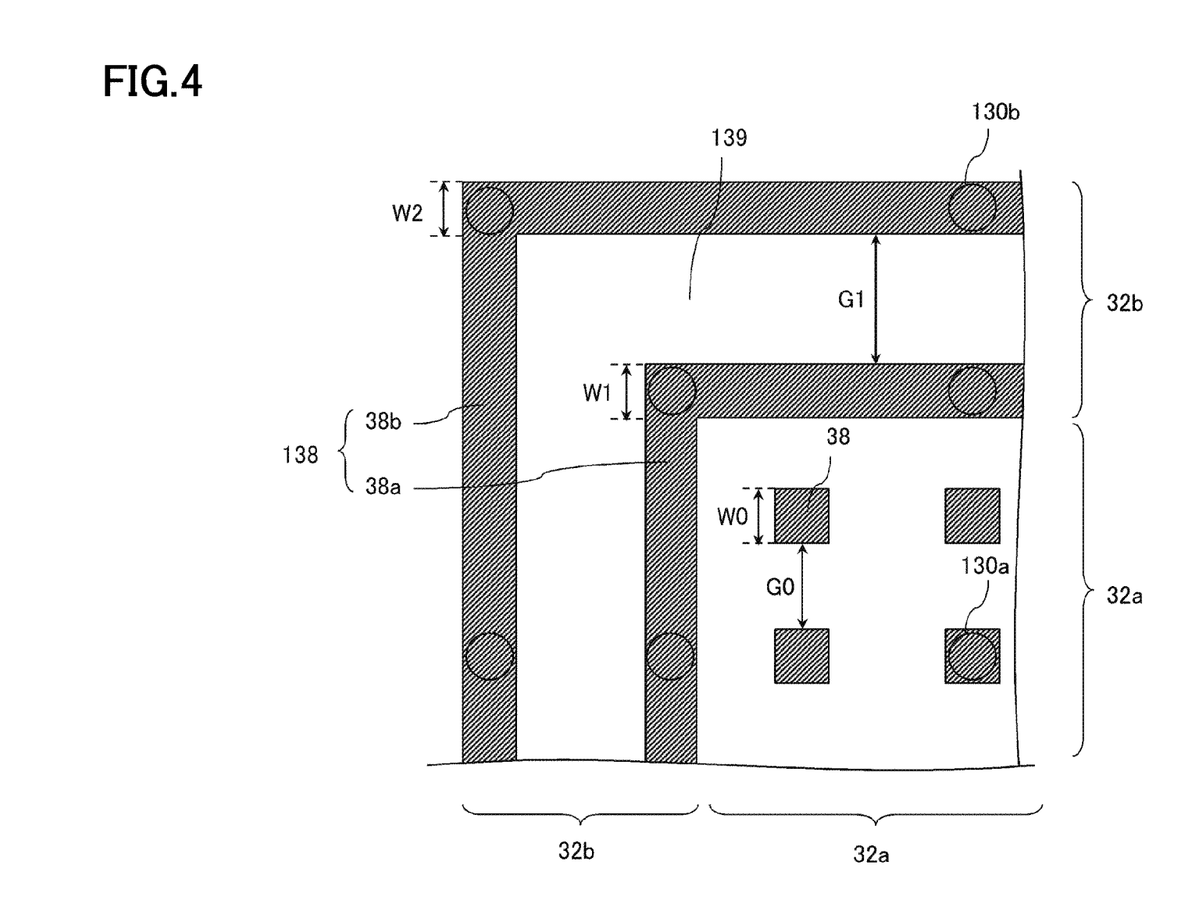
FIG. 4 is a plan view illustrating a counter substrate of a first display panel according to a first exemplary embodiment.

A specific configuration of first display panel 21 of the first exemplary embodiment will be described below. FIG. 4 is a plan view illustrating counter substrate 32 of first display panel 21 of the first exemplary embodiment. A part of counter substrate 32 of first display panel 21 of the first exemplary embodiment is cut out in FIG. 4.

As illustrated in FIG. 4, in first pixel area 32a of counter substrate 32 of the first exemplary embodiment, a plurality of light shielding layers 38 are formed into an island shape in planar view. In other words, in first pixel area 32a, a plurality of light shielding layers 38 are arranged so as to be separated from each other. For example, each light shielding layer 38 is formed so as to overlap the thin film transistor formed in TFT substrate 31 of first display panel 21 in planar view. In this case, each light shielding layer 38 is formed into a rectangular shape. However, each light shielding layer 38 is not limited to the rectangular shape, but light shielding layer 38 may be formed into another shape. Spacers 130a disposed in pixel section 101 among the plurality of spacers 130 respectively overlap with light shielding layers 38 formed into the island shape in planar view. In first pixel area 32a, by way of example, the plurality of light shielding layers 38 are formed into the island shape. However, for example, light shielding layer 38 may be formed into a lattice shape or a stripe shape.

In first frame area 32b of counter substrate 32 of the first exemplary embodiment, light shielding non-forming region 139 is formed between neighboring two light shielding forming regions 138 in planar view. Specifically, light shielding forming regions 138 include first frame-shaped light shielding forming region 38a surrounding the periphery of the pixel section 101 (first pixel area 32a) and second frame-shaped light shielding forming region 38b located outside first frame-shaped light shielding forming region 38a to surround first frame-shaped light shielding forming region 38a. Light shielding non-forming region 139 is disposed between first frame-shaped light shielding forming region 38a and second frame-shaped light shielding forming region 38b. The plurality of spacers 130b are disposed in frame section 102 so as to overlap first frame-shaped light shielding forming region 38a or second frame-shaped light shielding forming region 38b in planar view.

According to the first exemplary embodiment, light shielding non-forming region 139 is thus formed between light shielding layers 38 in first frame area 32b of counter substrate 32. Therefore, the level difference is formed by light shielding layer 38, and the formation area of light shielding layer 38 and the formation area of the convex region of overcoat layer 239 are reduced in first frame area 32b. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 and counter substrate 32 of liquid crystal display device 1.

Width W0 in the row or column direction of each light shielding layer 38 formed in first pixel area 32a of counter substrate 32, width W1 of first frame-shaped light shielding forming region 38a (i.e. width of a light shielding layer disposed on first frame-shaped light shielding forming region 38a), and width W2 of second frame-shaped light shielding forming region 38b (i.e. width of a light shielding layer disposed on second frame-shaped light shielding forming region 38b) may be equal to one another. Interval G0 between adjacent light shielding layers 38 disposed in first pixel area 32a of counter substrate 32 and interval G1 between first frame-shaped light shielding forming region 38a and second frame-shaped light shielding forming region 38b may be equal to each other. Therefore, the formation area of light shielding layer 38 and the formation area of the convex region of overcoat layer 239 can be uniformized in pixel section 101 and frame section 102. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 and counter substrate 32 of liquid crystal display device 1.

As illustrated in FIG. 2, in planar view, light shielding non-forming region 139 included in first frame area 32b of first display panel 21 may overlap light shielding layer 48 included in second frame area 42b of second display panel 22. Therefore, the light transmitted through light shielding non-forming region 139 included in frame section 102 of first display panel 21 can be blocked by light shielding layer 48 included in frame section 102 of second display panel 22.

As illustrated in FIG. 2, in planar view, light shielding forming region 138 included in first frame area 32b of first display panel 21 may overlap light shielding layer 48 included in second frame area 42b of second display panel 22.

Second Exemplary Embodiment

Figure 5:
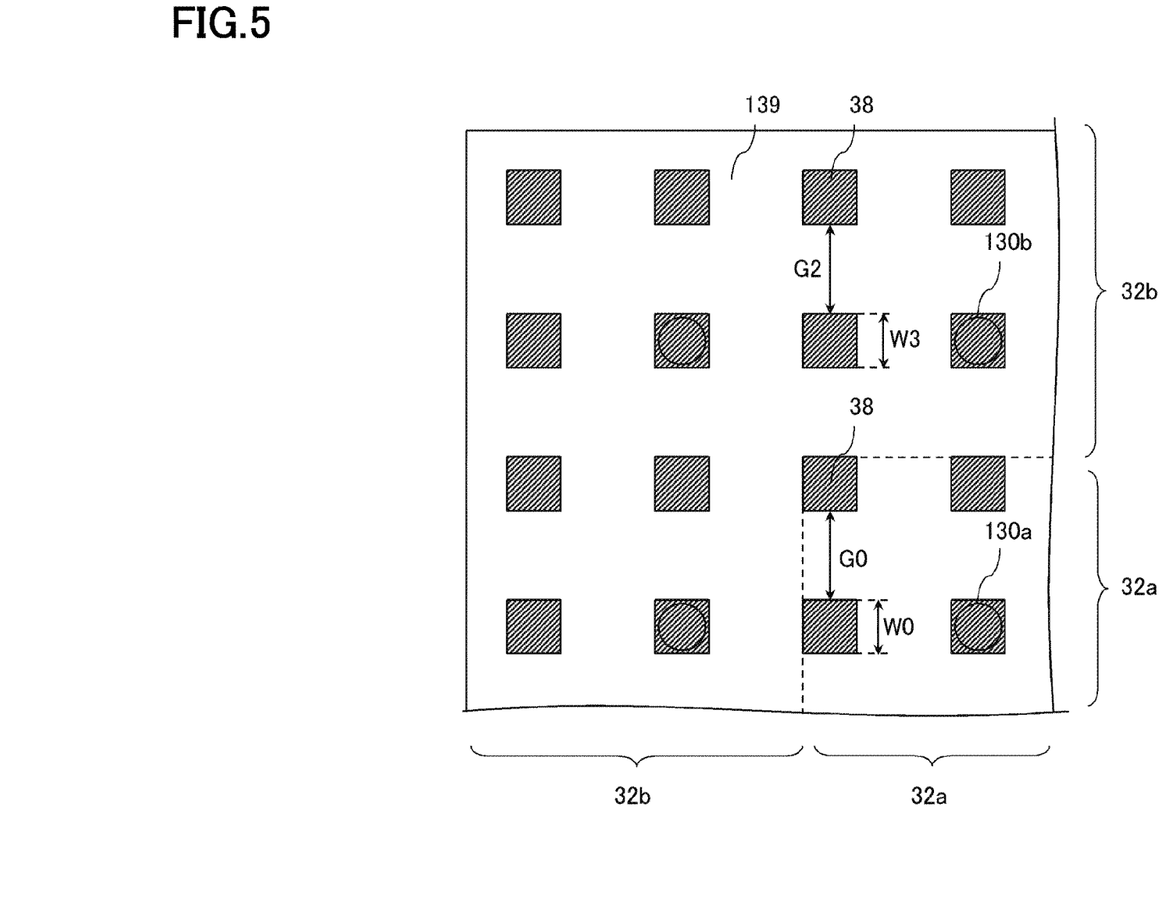
FIG. 5 is a plan view illustrating a counter substrate of a second display panel according to a second exemplary embodiment.

FIG. 5 is a plan view illustrating counter substrate 32 of first display panel 21 according to a second exemplary embodiment. A part of counter substrate 32 of first display panel 21 of the second exemplary embodiment is cut out in FIG. 5. Because the shape of light shielding layer 38 in pixel section 101 of the second exemplary embodiment is similar to that of the first exemplary embodiment, the overlapping description is omitted.

In first frame area 32b of counter substrate 32 of the second exemplary embodiment, the plurality of light shielding layers 38 are formed into the island shape in planar view. That is to say, a plurality of the light shielding layers 38 are arranged so as to be separated from each other. The plurality of light shielding layers 38 formed into the island shape constitute light shielding forming region 138. Light shielding non-forming region 139 is disposed between the plurality of light shielding forming regions 38 formed into the island shape. In this case, each light shielding layer 38 is formed into the rectangular shape. However, light shielding layer 38 is not limited to the rectangular shape, but light shielding layer 38 may be formed into another shape. The plurality of spacers 130b in frame section 102 are disposed so as to overlap light shielding layers 38 formed into the island shape in planar view.

According to the second exemplary embodiment, the plurality of light shielding layers 38 having the island shape are spread in whole counter substrate 32. Therefore, the level difference is formed by light shielding layer 38, and the formation area of light shielding layer 38 and the formation area of the convex region of overcoat layer 239 can be uniformized in pixel section 101 and frame section 102. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 and counter substrate 32 of liquid crystal display device 1.

Width W0 in the row or column direction of each light shielding layer 38 formed in first pixel area 32a of counter substrate 32 and width W3 in the row or column direction of each light shielding layer 38 formed in first frame area 32b of counter substrate 32 may be equal to each other. Interval G0 between adjacent light shielding layers 38 disposed in first pixel area 32a of counter substrate 32 and interval G2 between adjacent light shielding layers 38 disposed in first frame area 32b of counter substrate 32 may be equal to each other. The plurality of light shielding layers 38 having the identical area are formed into the island shape at regular intervals in whole counter substrate 32. Therefore, the formation area of light shielding layer 38 and the formation area of the convex region of overcoat layer 239 can further be uniformized in pixel section 101 and frame section 102. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 of liquid crystal display device 1 and counter substrate 32.

Third Exemplary Embodiment

Figure 6:
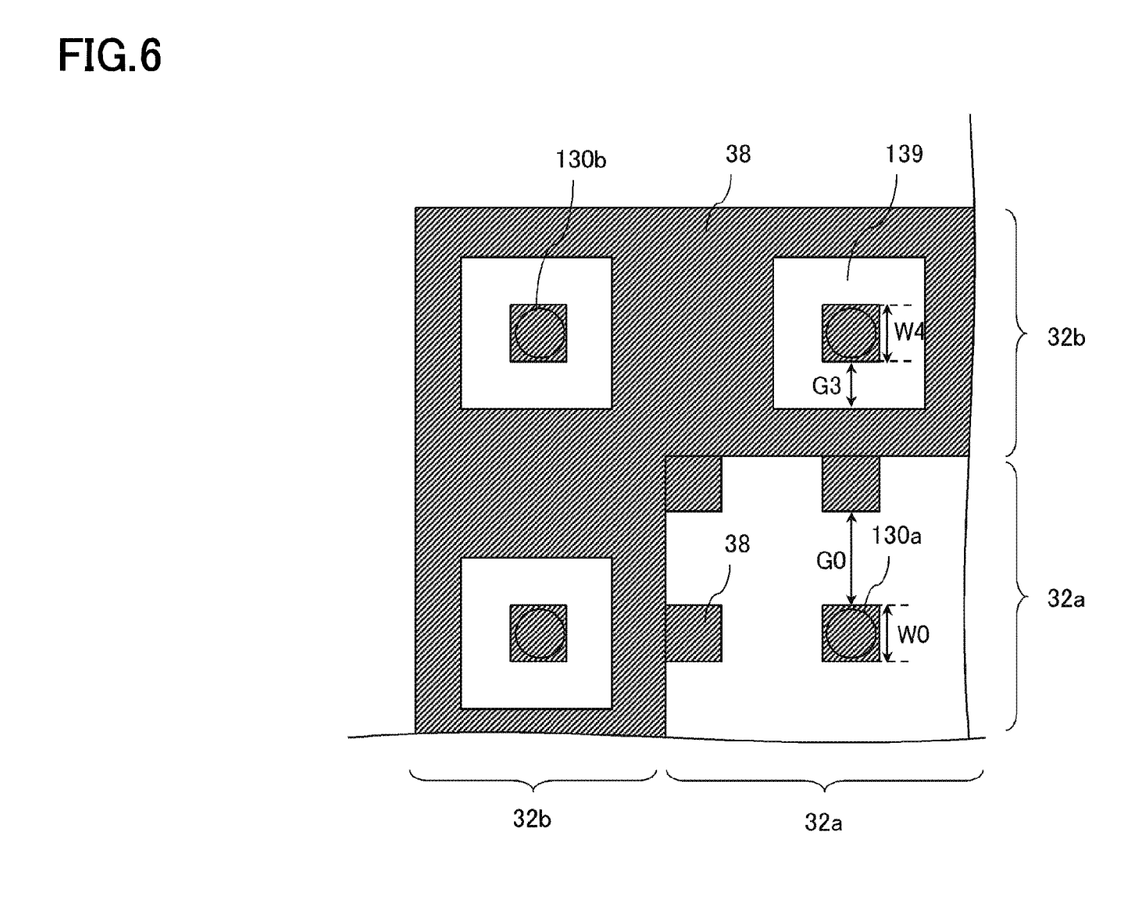
FIG. 6 is a plan view illustrating a counter substrate of a third display panel according to a third exemplary embodiment.

FIG. 6 is a plan view illustrating counter substrate 32 of first display panel 21 according to a third exemplary embodiment. A part of counter substrate 32 of first display panel 21 of the third exemplary embodiment is cut out in FIG. 6. Because the shape of light shielding layer 38 in pixel section 101 of the third exemplary embodiment is similar to that of the first exemplary embodiment, the overlapping description is omitted.

In first frame area 32b of counter substrate 32 of the third exemplary embodiment, each annular-shaped (frame-shaped) light shielding non-forming region 139 is disposed so as to surround the periphery of spacer 130 disposed in corresponding light shielding layer 38 in planar view. The light shielding forming region is constructed with island-shaped light shielding layer 38 surrounded by frame-shaped light shielding non-forming region 139 and light shielding layer 38 disposed outside frame-shaped light shielding non-forming region 139.

According to the third exemplary embodiment, frame-shaped light shielding non-forming region 139 is formed so as to surround the periphery of spacer 130 in first frame area 32b of counter substrate 32. Therefore, the level difference is formed by light shielding layer 38, and the formation area of light shielding layer 38 in the vicinity of spacer 130 in frame section 102 and the formation area of the convex region of overcoat layer 239 are reduced. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 and counter substrate 32 of liquid crystal display device 1.

Width W0 in the row or column direction of each light shielding layer 38 formed in first pixel area 32a of counter substrate 32 and width W4 in the row or column direction of island-shaped light shielding layer 38 surrounded by frame-shaped light shielding non-forming region 139 in first frame area 32b of counter substrate 32 may be equal to each other. Interval G0 in the row or column direction between adjacent light shielding layers 38 disposed in first pixel area 32a of counter substrate 32 and width G3 in the row or column direction of frame-shaped light shielding non-forming region 139 disposed in first frame area 32b of counter substrate 32 (in other words, a distance in the row or column direction from island-shaped light shielding layer 38 in first frame area 32b of counter substrate 32 to light shielding layer 38 adjacent to said island-shaped light shielding layer 38) may be equal to each other. Therefore, in the vicinity of spacer 130, the formation area of light shielding layer 38 and the formation area the convex region of overcoat layer 239 can be uniformized in pixel section 101 and frame section 102. Resultantly, the thickness of the spacer forming resin film is uniformized in pixel section 101 and frame section 102, and the height of spacers 130 are uniformized in pixel section 101 and frame section 102. This enables the uniformization of the gap between TFT substrate 31 of liquid crystal display device 1 and counter substrate 32.

In the above, the specific embodiments of the present application have been described, but the present application is not limited to the above-mentioned embodiments, and various modifications may be made as appropriate without departing from the spirit of the present application.

What is claimed is:

1. A display device comprising a first display panel in which a pixel section is defined as a display region where an image is displayed and a frame section is defined as a non-display region surrounding a periphery of the pixel section,
wherein the first display panel includes:
a first substrate;
a second substrate that is disposed opposite to the first substrate and includes a light shielding layer; and
a plurality of spacers formed between the first substrate and the second substrate,
the second substrate includes a first frame area constituting a part of said second substrate disposed in the frame section, the first frame area including a light shielding forming region where the light shielding layer is formed and a light shielding non-forming region where the light shielding layer is not formed, and
a spacer disposed in the frame section among the plurality of spacers is formed on the light shielding forming region among the light shielding forming region and the light shielding non-forming region, and the light shielding non-forming region is disposed around the spacer disposed on the light shielding forming region and does not overlap with the spacer,
wherein the first display panel displays a monochrome image,
the display device further comprises a second display panel that displays a color image, the second display panel being disposed while overlapped on the first display panel,
the second display panel includes a second frame area constituting a part of said second display panel disposed in the frame section, the second frame area including a second light shielding layer, and
the light shielding non-forming region disposed in the first frame area of the first display panel overlaps the second light shielding layer in planar view.

2. The display device according to claim 1, wherein the light shielding non-forming region is formed between neighboring two light shielding forming regions in planar view.

3. The display device according to claim 1, wherein the light shielding forming region includes a first frame-shaped light shielding forming region surrounding the periphery of the pixel section and a second frame-shaped light shielding forming region located outside the first frame-shaped light shielding forming region to surround the first frame-shaped light shielding forming region, and the light shielding non-forming region is disposed between the first frame-shaped light shielding forming region and the second frame-shaped light shielding forming region.

4. The display device according to claim 3, wherein the second substrate further includes a first pixel area constituting a part of said second substrate disposed in the pixel section,
a width of the light shielding layer located in the first pixel area and a width of the light shielding layer located in the first frame area are equal to each other.

5. The display device according to claim 3, wherein the second substrate further includes a first pixel area constituting a part of said second substrate disposed in the pixel section, and
an interval between adjacent light shielding layers formed in the first pixel area of the second substrate and an interval between adjacent light shielding layers formed in the first frame area of the second substrate are equal to each other.

6. The display device according to claim 1, wherein a plurality of the light shielding forming regions are arranged so as to be separated from each other, and the light shielding non-forming region is formed around the light shielding forming region.

7. The display device according to claim 6, wherein the second substrate further includes a first pixel area constituting a part of said second substrate disposed in the pixel section, and
a width of the light shielding layer located in the first pixel area and a width of the light shielding layer located in the first frame area are equal to each other.

8. The display device according to claim 6, wherein the second substrate further includes a first pixel area constituting a part of said second substrate disposed in the pixel section, and
an interval between adjacent light shielding layers formed in the first pixel area of the second substrate and an interval between adjacent light shielding layers formed in the first frame area of the second substrate are equal to each other.

9. The display device according to claim 1, wherein the light shielding non-forming region is formed into an annular-shape so as to surround a periphery of the spacer disposed in the light shielding forming region in planar view.

10. The display device according to claim 1, wherein in the first pixel area of the second substrate, a plurality of the light shielding layers are arranged so as to be separated from each other.

11. A display device comprising a first display panel in which a pixel section is defined as a display region where an image is displayed and a frame section is defined as a non-display region surrounding a periphery of the pixel section,
wherein the first display panel includes:
a first substrate;
a second substrate that is disposed opposite to the first substrate and includes a light shielding layer; and
a plurality of spacers formed between the first substrate and the second substrate,
the second substrate includes a first frame area constituting a part of said second substrate disposed in the frame section, the first frame area including a light shielding forming region where the light shielding layer is formed and a light shielding non-forming region where the light shielding layer is not formed, and a spacer disposed in the frame section among the plurality of spacers is formed on the light shielding forming region in the first frame area of the second substrate, and the light shielding non-forming region is disposed around the spacer disposed on the light shielding forming region, wherein a plurality of the light shielding forming regions are arranged so as to be separated from each other, the light shielding non-forming region is formed around the light shielding forming region, the second substrate further includes a first pixel area constituting a part of said second substrate disposed in the pixel section, and an interval between adjacent light shielding layers formed in the first pixel area of the second substrate and an interval between adjacent light shielding layers formed in the first frame area of the second substrate are equal to each other.

12. A display device comprising a first display panel in which a pixel section is defined as a display region where an image is displayed and a frame section is defined as a non-display region surrounding a periphery of the pixel section, wherein the first display panel includes:
a first substrate;
a second substrate that is disposed opposite to the first substrate and includes a light shielding layer; and
a plurality of spacers formed between the first substrate and the second substrate, the second substrate includes a first frame area constituting a part of said second substrate disposed in the frame section, the first frame area including a light shielding forming region where the light shielding layer is formed and a light shielding non-forming region where the light shielding layer is not formed, and a spacer disposed in the frame section among the plurality of spacers is formed on the light shielding forming region in the first frame area of the second substrate, and the light shielding non-forming region is disposed around the spacer disposed on the light shielding forming region, wherein the light shielding non-forming region is formed into an annular-shape so as to surround a periphery of the spacer disposed in the light shielding forming region in planar view.

13. A display device comprising a first display panel in which a pixel section is defined as a display region where an image is displayed and a frame section is defined as a non-display region surrounding a periphery of the pixel section, wherein the first display panel includes:
a first substrate;
a second substrate that is disposed opposite to the first substrate and includes a light shielding layer; and
a plurality of spacers formed between the first substrate and the second substrate, the second substrate includes a first frame area constituting a part of said second substrate disposed in the frame section, the first frame area including a light shielding forming region where the light shielding layer is formed and a light shielding non-forming region where the light shielding layer is not formed, and a spacer disposed in the frame section among the plurality of spacers is formed on the light shielding forming region in the first frame area of the second substrate, and the light shielding non-forming region is disposed around the spacer disposed on the light shielding forming region, wherein the light shielding forming region includes a first frame-shaped light shielding forming region surrounding the periphery of the pixel section and a second frame-shaped light shielding forming region located outside the first frame-shaped light shielding forming region to surround the first frame-shaped light shielding forming region, the light shielding non-forming region is disposed between the first frame-shaped light shielding forming region and the second frame-shaped light shielding forming region, the second substrate further includes a first pixel area constituting a part of said second substrate disposed in the pixel section, and an interval between adjacent light shielding layers formed in the first pixel area of the second substrate and an interval between adjacent light shielding layers formed in the first frame area of the second substrate are equal to each other.

* * * * *